Figure 1:
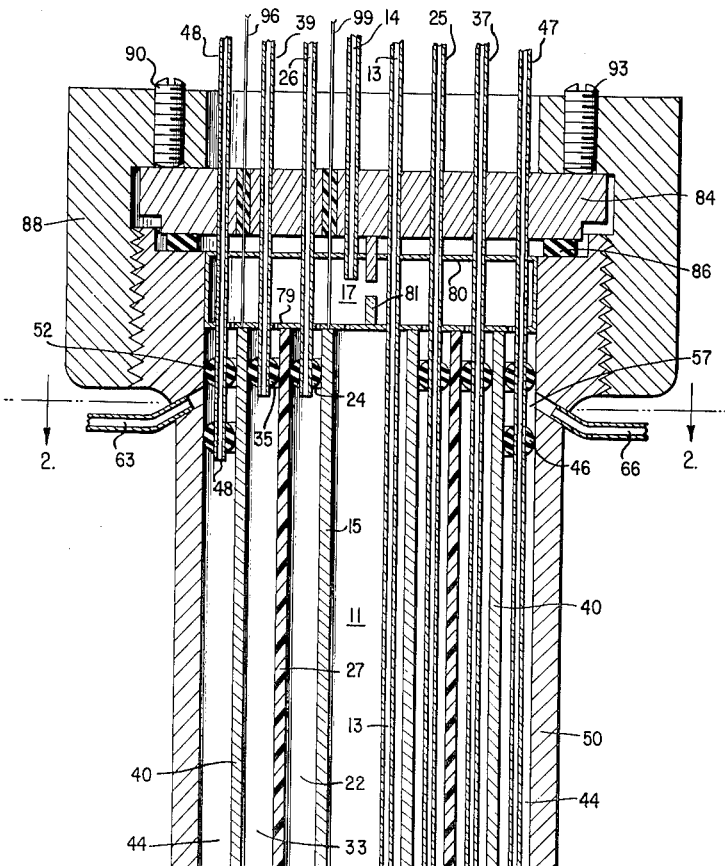

Feb. 22, 1966

E. C. LEWIS 3,236,692

REACTION CELL

Filed June 1, 1962

INVENTOR.
EDWARD C. LEWIS

BY Adams, Forward & McLean

ATTORNEYS.

United States Patent Office 3,236,692
Patented Feb. 22, 1966

3,236,692
REACTION CELL
Edward C. Lewis, Homewood, Ill., assignor to Sinclair Research, Inc., Wilmington, Del., a corporation of Delaware
Filed June 1, 1962, Ser. No. 199,518
7 Claims. (Cl. 136—86)

This invention is a novel reaction cell which may be employed for the generation of electricity. Typical such reaction cells have become known in the art as "fuel cells."

During the past decade a great deal of attention has been focused on the fuel cell as a possible means for generating electrical power. The fuel cell may be defined as "an electrochemical device in which part of the energy, derived from chemical reaction maintained by the continuous supply of chemical reactants, is converted to electrical energy." Such a device has become the subject of interest as a result of demands for new and improved power sources. Many of these demands stem from the military forces, where power sources not endowed with the characteristics of those presently in use are urgently needed.

Fuel cells may offer an efficient device by which the energy released from the oxidation of fuels may be converted to useful work, in the form of electrical power. Thus it is possible to convert a major portion of the energy of chemical reaction into useful work without employing a conventional heat engine. Conventional electrical power generation is rarely achieved with an overall energy efficiency of more than 40% based on conversion of chemical energy of the fuel into electrical energy, but fuel cells offer the promise of greater conversion efficiency, along with the absence of noise and excessive heat generation, reduction of moving parts, compactness and light weight versatility of fuel utilization and other advantages.

The basic components of most fuel cells in addition to the fuels, are the electrodes and the electrolytes. The fuels generally consist of an oxidant or electron acceptor and the reductant or electron donor. One of the simplest forms of fuel cell consists of an aqueous alkaline electrolyte bath in which two electrodes are immersed and connected to a load outside the bath. If hydrogen is passed into the solution at one electrode and oxygen is passed into the electrolyte at the other electrode, the hydrogen is oxidized at its electrode changing from the neutral to the ionic condition and giving electrons to the anode. Likewise oxygen at the cathode is reduced, taking electrons from the cathode for conversion to the ionic (hydroxyl) state. This system is not greatly efficient, too much of the hydrogen and oxygen reacting without electron interchange with the anode and cathode, and furthermore this system may be dangerous in providing explosive mixtures of hydrogen and oxygen to the alkaline electrolyte solution.

More sophisticated attempts to achieve electrochemical combustion have led to systems which provide for complete separation of the primary oxidant and primary reductant. One such system, which commonly is called a Redox system, provides for completely different electrolyte solutions surrounding the anode and cathode. In such a system the anolyte may contain a reducing agent such as stannous ion which becomes oxidized to stannic ion, giving electrons to the anode. The catholyte may be a solution of oxidizing agent, for example, elemental bromine dissolved in an electrolytic solution. The elemental bromine becomes reduced to bromide ion, removing electrons from the cathode. The stannous ion may be regenerated from the stannic ion by reduction outside the fuel cell and the bromide ion may be oxidized back to elemental bromine outside the fuel cell; however, in a further elaboration of this type of system an ion-permeable membrane may be provided between the anolyte and catholyte in order that the stannic ion, which is a mild oxidizing agent in the presence of bromide, and the bromide ion, which is a mild reducing agent in the presence of stannic ion may exert an influence over each other to regenerate stannous ion and elemental bromine without actual contact between the anolyte and catholyte solutions.

A fuel cell employing such an anolyte-catholyte system must be provided with an ion-permeable separator for the anolyte and catholyte, with compartments for the anolyte and catholyte, with a cathode and an anode, and, of course with compartments for the oxidant and primary reductant fuel. The efficiency of the fuel cell increases as the size of the compartments and thickness of the solid members shrinks, yet there must be clear space between anode and cathode and between oxidant and reductant fuels. Further, it has been found that the efficiency often increases with the use of higher temperatures and pressures. Higher temperatures and pressures also frequently allow cheaper fuels, for example, hydrocarbon gases and air rather than hydrogen and oxygen, to be used to force the oxidation and reduction of anolyte and catholyte.

The novel apparatus of this invention is suitable for maintaining optimum conditions of operation of chemical and electrochemical reactions. It is designed to maintain temperature and pressure differentials, to prevent corrosion and leakage between containers and compartments, to provide minimum space between the elements, to isolate highly reactive materials, and it also offers an ease of fabrication replacement and repair of parts not found in prior fuel cells and related devices known to the art. Positive sealing provides for flow of materials from one compartment to another only through porous electrodes and membranes and the pressure drop across any of these solid members may be small or even zero, an important advantage in view of the fact that these members are chosen for chemical characteristics, not mechanical strength. Pressure and temperature regulation may be provided for outside the cell. The apparatus of this invention includes a sealed, rigid cylindrical shell containing a number of concentric tubes within the shell. The tubes are made into compartments by the use of seals at the ends of the tubes, such as O rings and the like. Within the space between adjacent tubes and the seals are a number of isolated annular chambers suitable for containing materials used in an electrochemical process, such as electrolytes and fuels. Between the ends of the tubes and the shell, spaces are provided for the equalization of pressure on both sides of the sealing means. The annular space inside one tube, preferably the innermost tube, communicates with the end spaces. Thus one of the reactants may be used to supply pressure equalization. Seals between tubes may be bored or slotted to provide space for passage of conduits, etc. and a structure is also provided to support such conduits, as well as the tubes, in a fixed position within the shell. The invention also provides for double seals to separate materials which may react with each other violently, and provides also for the flow of inert gas as an additional separatant between the double seals.

In this invention the concentrically arranged tubes are made of materials suitable to perform the desired function. For example, the cathode and anode may comprise tubes of material suitable for such function and may be connected to electrical leads. Also an ion-permeable membrane may be provided by a tube made of ion exchange resin. The cylindrical form of these members gives added strength which would be lacking were these members made of flat stock of the same thickness.

The invention will be better understood by reference to the accompanying drawings which are to be considered illustrative only and not limiting.

Figure 2:
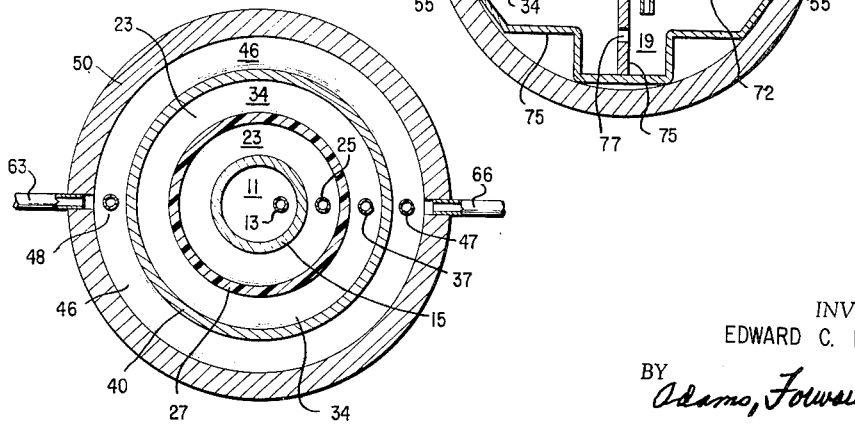

In the drawing FIGURE 1 is a cross-section elevational view of the fuel cell, and FIGURE 2 is a cross-sectional view along the line 2—2 of FIGURE 1.

The fuel cell proper comprises the chamber 11 provided with the conduits 13 and 14, formed by the tube 15, the header 17 and the bottom chamber 19. The chamber 22 has the sealing rings 23 and 24, through which pass conduits 25 and 26, and is contained between tubes 15 and 27. The chamber 33 has sealing rings 34 and 35 and conduits 37 and 39 and extends from tube 27 to tube 40. Chamber 44 has sealing rings 45 and 46 and conduits 47 and 48 and extends from tube 40 to the cylindrical shell 50.

It will be noted that the space between tube 40 and shell 50 is provided with the sealing rings 52 and 55 on the other side of rings 45 and 46 from the chamber 44, providing space 57 between rings 46 and 52 and space 60 between rings 45 and 55. These spaces may be provided with ducts 63, 66, 68 and 70 piercing the shell on opposite sides for connection to a suitable source of fluid. Header chamber 17 and bottom chamber 19 are provided with passageways not only to the central chamber 11 but also to the opposite sides of sealing rings 23, 24, 34, 35, 52 and 55 from the chambers 22, 33, 57 and 60. Thus the pressure on each side of the sealing ring may be equalized sufficient to prevent dislodgment of the sealing ring. Also, the use of pressure on both sides of the sealing ring, when an O ring is employed, serves to flatten the ring and increase its sealing engagement with the concentric tubes.

The tubes are supported by the floor 72 which comprises the roof of bottom-chamber 19 and this floor may in turn be propped by the various braces 75 which can be provided with perforations such as 77 to provide for even fluid distribution along the floor 72. Header space 17 has the floor 79 which serves to enclose and align the concentric tubes. The header space is provided with the lid 80 and also, if desired, with perforated props such as 81.

The shell 50 is suitably provided with the cover 84 which has the sealing ring 86. The cover may be held down by clamping nut 88 and the sealing of the cover 84 and ring 86 to the shell 50 may be insured by tightening of the screws 90 and 93. As shown cover 84 is provided with passageways for the conduits 48, 39, 26, 14, 13, 25, 37, and 47 which conduct fresh and exhausted reactants and electrolytes to and from the reaction cell. In addition, for example where tubes 15 and 40 are electrodes, the cover 84 may also allow passage of lead wires such as 96 and 99.

The assembly of the apparatus of the invention and its operation as a fuel cell can be performed as follows: Electrodes 15 and 40 can be made, for example of inert porous carbon in a cylindrical shape of suitable diameter. If desired, there may be incorporated in the composition of electrode 40 a material which acts as a catalyst in the oxidation of a fuel, such as propane. Likewise, if desired, electrode 15 may incorporate a material which catalyzes the reduction of the oxidant, usually oxygen. Ion-permeable membrane 27 is also a cylindrical tube and may comprise, for example a divinyl benzene cross-linked styrene-sulfonic acid ion exchange material in the hydrogen form dispersed, for example, in a polyethylene matrix. Electrode 15 is provided on its ends with the sealing rings 23 and 24, the sealing ring 24 being provided with suitable slots for the insertion of conduits 25 and 26. Ion-permeable cylinder 27 is slipped onto the outside of these sealing rings and it in turn is provided on its ends with sealing rings 34 and 35, the latter being suitably slit or bored for insertion of the conduits 37 and 39. Electrode 40 is placed over these rings and sealing rings 55 and 45, suitably separated from each other, are placed upon its lower end. The upper end of electrode 40 is provided with the sealing rings 46 and 52 which are suitably slit or bored for the reception of conduits 47 and 48. Braces 75 are put in the bottom of shell 50, and floor 72 is inserted. Then the cylinder assembly is put into the shell and floor 79 is placed above it. Props 81 may be inserted and lid 80 is placed above these and fastened down to enclose the header space 17. Sealing ring 86 is placed on the shoulder of shell 50 and cover 84 is set on top of this ring. Conduits 48, 39 and 26 are inserted through cover 84, lid 80, floor 79 and the sealing rings to provide for effluent material from chambers 22, 33 and 44. Conduit 14 is inserted through cover 84 and lid 80 into the header space 17, also to provide for effluent removal. Conduit 13 is inserted through the cover and header space and also through the roof 72 to provide gaseous oxidant to the bottom space 19, the chamber 11 and the header space 17. Conduit 25 is inserted through the cover and lid and sealing ring 24 to the bottom portion of chamber 22. Likewise conduits 37 and 47 are inserted through the cover and lid and their respective sealing rings to the bottom of chambers 33 and 44 respectively. Lead wires 96 and 99 are inserted through cover 84, lid 80 and floor 79 to form electrical contact with the electrodes 40 and 15. Also suitable electrical insulation is inserted through the cover 84 to prevent short circuiting. Electrode glands are commercially available to facilitate passage of leads 96 and 99 through the cover. Clamp nut 88 is fastened down over cover 84 and shell 50 and screws 90 and 93 are fastened down. Ducts 63 and 68 are joined to a suitable source of inert pressurized gas and ducts 66 and 70 are connected to suitable pressurized receivers for exhaust of inert gas. Leads 96 and 99 are joined to opposite sides of a suitable electrical load.

A suitable anolyte, for example an aqueous solution of stannous chloride and HCl is supplied to chamber 22 by conduit 25 and effluent from this conduit is slowly removed by conduit 26. A suitable catholyte, for example, an aqueous solution of elemental bromine and HCl is supplied to chamber 33 by conduit 37. Effluent from chamber 33 may be slowly removed by conduit 39. A suitable oxygen-containing gas, for example, air, is supplied to chambers 17, 11 and 19 by the conduit 13 and effluent air containing waste combustion products is removed by conduit 14. Likewise, a reducing gas, preferably propane, is supplied to chamber 44 by conduit 47 and waste gas, containing combustion products is removed by line 48. These gases and also the inert gas are supplied at pressures and temperatures for optimum performance of the electrocombustion process.

The driving force for production of electricity may be conceived of in the following manner. Oxygen in chamber 11 attracts hydrogen ions through the electrode 15 converting the hydrogen ions to water by taking electrons from the electrode. This converts electrode 15 into an anode. Removal of hydrogen ions from the anolyte tends to leave excess hydroxyl ions in the anolyte, and to accommodate these extra negatively charged ions, stannous ion in the anolyte changes to stannic ion.

Propane in chamber 44 attracts hydroxyl ions through the electrode 40 converting these hydroxyl ions, for example, to propyl alcohol and water and giving electrons to the electrode 40. This makes electrode 40 a cathode. This removal of hydroxyl ions from the catholyte in chamber 33 tends to leave excess hydrogen ions in the catholyte and to accommodate these extra ions, the elemental bromine is reduced to HBr. Stannic ions and bromide ions are in electrical contact with each other through the ion permeable membrane 27, tending to conduct electrons from the bromine ion to the stannic ion to convert these materials to elemental bromine and stannous ion. The ions common to both anolyte and catholyte, namely H+, Cl— and OH—, being smaller than the tin or bromine ions tend preferentially to migrate through the ion-permeable membrane carrying the required electrons from bromide to stannic ions. In the hereindescribed apparatus, since the ion-permeable membrane contains a cationic exchange material, that is, labile hydrogen ion, the electron transfer mechanism between anolyte and catholyte will probably be the hydrogen ion. Leads 96 and 99 having been connected to a load, current will flow through the load, carrying excess electrons from the cathode to the electron-deficient anode.

It will be noted that the novel apparatus of this invention provides for total isolation of the electrolytes, which frequently are inclined to be corrosive, from any of the metal parts. It will be apparent also that additions to the apparatus, such as thermowells, pressure relieving devices, etc., not shown, may be incorporated into the apparatus and that further concentric tubes, with their associated sealing elements may be included to provide further chambers, where desired.

It is claimed:

1. An apparatus of the type described comprising a sealed, rigid, cylindrical shell containing a plurality of tubes concentrically spaced within said shell, sealing means between adjacent ends of adjacent pairs of said tubes, said adjacent pairs of tubes and said sealing means related thereto defining a plurality of annular chambers, end spaces defined between said shell on the one hand and the ends of said tubes and seals therebetween on the other hand, the annular space within one of said tubes communicating with said end spaces, conduits leading from said annular chambers to the exterior of said shell, said sealing means being slotted to receive said conduits, and means for supporting said tubes in a fixed position within said shell.

2. The apparatus of claim 1 in which double seals are provided between the outermost of said tubes and said shell at the ends of said outer tube to define intermediate spaces between said outer tube, said shell, and said double seals, and inlet and outlet conduits for conducting fluid purge media, said inlet conduits and said outlet conduits leading from said intermediate spaces to the exterior of said shell.

3. The apparatus of claim 1 in which the tubes have open ends and are rigidly held between the said end spaces.

4. The apparatus of claim 1 in which the sealing means are O-rings.

5. A reaction cell comprising a sealed, rigid, cylindrical shell containing a plurality of tubes concentrically spaced within said shell, said tubes including two electrically conductive tubes with an ion permeable tube therebetween, electrically insulating sealing means between adjacent ends of adjacent pairs of said tubes, said adjacent pairs of tubes and said sealing means related thereto defining an anolyte chamber between one electrically conductive tube and the ion permeable tube and a catholyte chamber between the other electrically conductive tube and the ion permeable tube, end spaces defined between said shell on the one hand and the ends of said tubes and seals therebetween on the other hand, the annular space within one of said tubes communicating with said end spaces, conduits leading from said annular chambers to the exterior of said shell, said sealing means being slotted to receive said conduits, means for supporting said tubes in a fixed position within said shell and means for electrically connecting said electrically conductive tubes to an electrical load.

6. The reaction cell of claim 5 in which compartments are provided adjacent said electrically-conductive tubes on the sides of these tubes opposite said electrolytes for reception of fuel and combustion gases.

7. The reaction cell of claim 5 in which the sealing means are O-rings.

References Cited by the Examiner
UNITED STATES PATENTS 2,901,523   8/1959   Justi et al. _____ 136—86
2,969,315   1/1961   Bacon _____ 136—86

WINSTON A. DOUGLAS, *Primary Examiner.*

JOHN R. SPECK, ALLEN B. CURTIS, *Examiners.*